United States Patent
Farag et al.

(10) Patent No.: US 12,149,941 B2
(45) Date of Patent: Nov. 19, 2024

(54) CROSS-CARRIER DIGITAL LEDGER FOR SUBSCRIBER IDENTIFICATION MODULE (SIM) RELATED DATA

(71) Applicant: T-Mobile USA, Inc., Bellevue, WA (US)

(72) Inventors: Paul Samuel Farag, Bellevue, WA (US); Christopher John Spanton, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 351 days.

(21) Appl. No.: 17/740,083

(22) Filed: May 9, 2022

(65) Prior Publication Data

US 2023/0362655 A1    Nov. 9, 2023

(51) Int. Cl.
| | |
|---|---|
| *H04W 12/126* | (2021.01) |
| *H04L 9/40* | (2022.01) |
| *H04W 12/122* | (2021.01) |
| *H04W 12/128* | (2021.01) |

(52) U.S. Cl.
CPC ....... *H04W 12/126* (2021.01); *H04L 63/1416* (2013.01); *H04W 12/122* (2021.01); *H04W 12/128* (2021.01)

(58) Field of Classification Search
CPC . H04W 12/06; H04W 12/126; H04W 12/128; H04W 12/122; H04W 12/12; H04W 12/02; H04W 12/08; H04W 12/068; H04W 12/069; H04L 63/1416; H04L 9/50; H04L 67/60
See application file for complete search history.

(56) References Cited

U.S. PATENT DOCUMENTS

| | | |
|---|---|---|
| 7,623,852 B2 | 11/2009 | Gnuschke |
| 7,920,899 B2 | 4/2011 | Jain |
| 7,953,443 B2 | 5/2011 | Liu |
| 7,954,141 B2 | 5/2011 | De et al. |
| 7,979,066 B2 | 7/2011 | Pan |
| 8,145,212 B2 | 3/2012 | Lopresti et al. |
| 8,175,622 B2 | 5/2012 | Jiang |
| 8,204,542 B2 | 6/2012 | Liao et al. |
| 8,219,811 B2 | 7/2012 | Roundtree |

(Continued)

FOREIGN PATENT DOCUMENTS

| | | |
|---|---|---|
| CN | 101496059 A | 7/2009 |
| EP | 1815704 A1 | 8/2007 |

(Continued)

*Primary Examiner* — Allahyar Kasraian
(74) *Attorney, Agent, or Firm* — Perkins Coie LLP

(57) ABSTRACT

A system can detect a change associated with a subscriber identity module (SIM) of a wireless device and generate a data record indicative of the change. In one example, the data record is stored on a digital ledger residing on a cryptographically secured and distributed peer-to-peer network (e.g., blockchain) that stores multiple data records of changes to SIMs of wireless devices. The system can determine whether a wireless device is impacted by malicious activity based on an age of its data record stored on the distributed ledger. For example, an aged data record indicates a lower probability that the wireless device was the subject of a SIM swap fraud whereas a newer data record indicates a higher probability of a SIM swap fraud.

20 Claims, 5 Drawing Sheets

(56) References Cited

U.S. PATENT DOCUMENTS

| | | |
|---|---|---|
| 8,489,071 B2 | 7/2013 | Mechaley |
| 8,780,797 B2 | 7/2014 | Chen et al. |
| 8,832,795 B2 | 9/2014 | Dowds et al. |
| 8,837,449 B2 | 9/2014 | Chen et al. |
| 8,868,042 B2 | 10/2014 | Mohammed et al. |
| 9,094,823 B2 | 7/2015 | Saino et al. |
| 9,307,397 B2 | 4/2016 | Poon et al. |
| 9,384,479 B2 | 7/2016 | Larkin |
| 9,572,015 B2 | 2/2017 | Marquardt |
| 9,609,510 B2 | 3/2017 | Raleigh et al. |
| 9,635,542 B2 | 4/2017 | Uhari et al. |
| 9,693,189 B2 | 6/2017 | Caldwell et al. |
| 9,716,999 B2 | 7/2017 | Zhang et al. |
| 9,723,481 B2 | 8/2017 | Schell et al. |
| 9,729,997 B2 | 8/2017 | Chen et al. |
| 9,735,821 B2 | 8/2017 | Vecera et al. |
| 9,736,689 B2 | 8/2017 | Liu et al. |
| 9,781,595 B2 | 10/2017 | Johnson et al. |
| 9,817,992 B1 | 11/2017 | Paczkowski et al. |
| 9,826,392 B2 | 11/2017 | Timonen et al. |
| 9,877,194 B2 | 1/2018 | Schell et al. |
| 9,906,254 B2 | 2/2018 | Zhao et al. |
| 9,917,609 B2 | 3/2018 | Smith et al. |
| 9,924,347 B1 | 3/2018 | Chastain et al. |
| 9,940,141 B2 | 4/2018 | Li et al. |
| 9,942,747 B2 | 4/2018 | Dowlatkhah et al. |
| 9,942,755 B2 | 4/2018 | Yang et al. |
| 9,942,757 B2 | 4/2018 | Brand et al. |
| 10,097,538 B1 * | 10/2018 | Sanchez ................. G06F 21/44 |
| 10,117,072 B1 | 10/2018 | Lee et al. |
| 10,117,165 B2 | 10/2018 | Kokkonen et al. |
| 10,277,587 B2 | 4/2019 | Li et al. |
| 10,321,303 B1 | 6/2019 | Namiranian |
| 10,362,475 B2 | 7/2019 | Namiranian |
| 10,798,564 B2 | 10/2020 | Namiranian |
| 10,867,024 B2 | 12/2020 | Singhal |
| 11,129,014 B2 | 9/2021 | Li et al. |
| 11,146,944 B1 | 10/2021 | Guru et al. |
| 11,308,487 B1 * | 4/2022 | Foster ................. G06Q 20/3829 |
| 11,310,225 B2 | 4/2022 | Aiello et al. |
| 11,310,654 B1 | 4/2022 | Indurkar |
| 2004/0038706 A1 | 2/2004 | Wasser |
| 2004/0158716 A1 | 8/2004 | Turtiainen et al. |
| 2004/0229601 A1 | 11/2004 | Zabawskyj et al. |
| 2005/0020308 A1 | 1/2005 | Lai |
| 2005/0075106 A1 | 4/2005 | Jiang |
| 2005/0108171 A1 | 5/2005 | Bajikar et al. |
| 2006/0291455 A1 | 12/2006 | Katz et al. |
| 2007/0213075 A1 | 9/2007 | Jiang |
| 2008/0081611 A1 | 4/2008 | Hoyt et al. |
| 2009/0191857 A1 | 7/2009 | Horn et al. |
| 2009/0239575 A1 | 9/2009 | Fu |
| 2010/0009659 A1 | 1/2010 | Netanel et al. |
| 2010/0093396 A1 | 4/2010 | Roundtree |
| 2010/0120453 A1 * | 5/2010 | Tamchina ........... H04M 1/2757 455/466 |
| 2012/0171996 A1 | 7/2012 | Mocanu et al. |
| 2013/0227646 A1 | 8/2013 | Haggerty et al. |
| 2017/0272933 A1 | 9/2017 | Zhao et al. |
| 2019/0130701 A1 * | 5/2019 | Simons ................. H04L 9/3226 |
| 2020/0050439 A1 | 2/2020 | Bjørdal et al. |
| 2022/0141669 A1 | 5/2022 | Daumer et al. |
| 2022/0337611 A1 * | 10/2022 | Brazao ..................... H04L 9/50 |
| 2022/0374847 A1 * | 11/2022 | Livesay ................... H04L 9/50 |
| 2024/0073697 A1 * | 2/2024 | Singh ..................... H04L 9/3239 |

FOREIGN PATENT DOCUMENTS

| | | |
|---|---|---|
| EP | 1872188 A2 | 1/2008 |
| EP | 2016544 A1 | 1/2009 |
| EP | 2815553 B1 | 5/2019 |
| WO | 2016005795 A1 | 1/2016 |
| WO | 2021224624 A1 | 11/2021 |

* cited by examiner

CROSS-CARRIER DIGITAL LEDGER FOR SUBSCRIBER IDENTIFICATION MODULE (SIM) RELATED DATA

BACKGROUND

A SIM card, also known as a subscriber identity module or Subscriber Identification Module (SIM), is an integrated circuit that can securely store the International Mobile Subscriber Identity (IMSI) number and its related key, which are used to identify and authenticate subscribers on mobile telephony devices. SIM cards can also be used in satellite phones, smart watches, computers, or cameras.

A SIM swap scam (also known as SIM swapping) is a type of account takeover fraud that generally targets a weakness in two-factor authentication and two-step verification in which the second factor or step is a text message (SMS) or call placed to a mobile telephone. The fraud exploits a mobile phone service provider's ability to seamlessly port a phone number to a mobile device containing a different SIM. This feature is normally used when a customer has lost or had their phone stolen or is switching service to a new phone.

The scam begins with a fraudster gathering personal details about the victim, either by use of phishing emails, by buying them from bad actors, etc. Equipped with the victim's personal details, the fraudster contacts the victim's mobile telephone provider to convince the telephone company to port the victim's phone number to the fraudster's SIM. This is done, for example, by impersonating the victim using personal details to appear authentic and claiming that they have lost their phone.

Once this happens, the victim's phone will lose connection to the network, and the fraudster will receive all the SMS and voice calls intended for the victim. This allows the fraudster to intercept any one-time passwords sent via text or telephone calls sent to the victim, to circumvent many two-factor authentication methods of accounts (e.g., bank accounts, social media accounts) that rely on text messages or telephone calls. The scam allows criminals to gain access to almost any account tied to the hijacked number. This may allow them to directly transfer funds from a bank account, extort the rightful owner, or sell accounts on the black market for identity theft.

BRIEF DESCRIPTION OF THE DRAWINGS

Detailed descriptions of implementations of the present invention will be described and explained through the use of the accompanying drawings.

Figure 1:
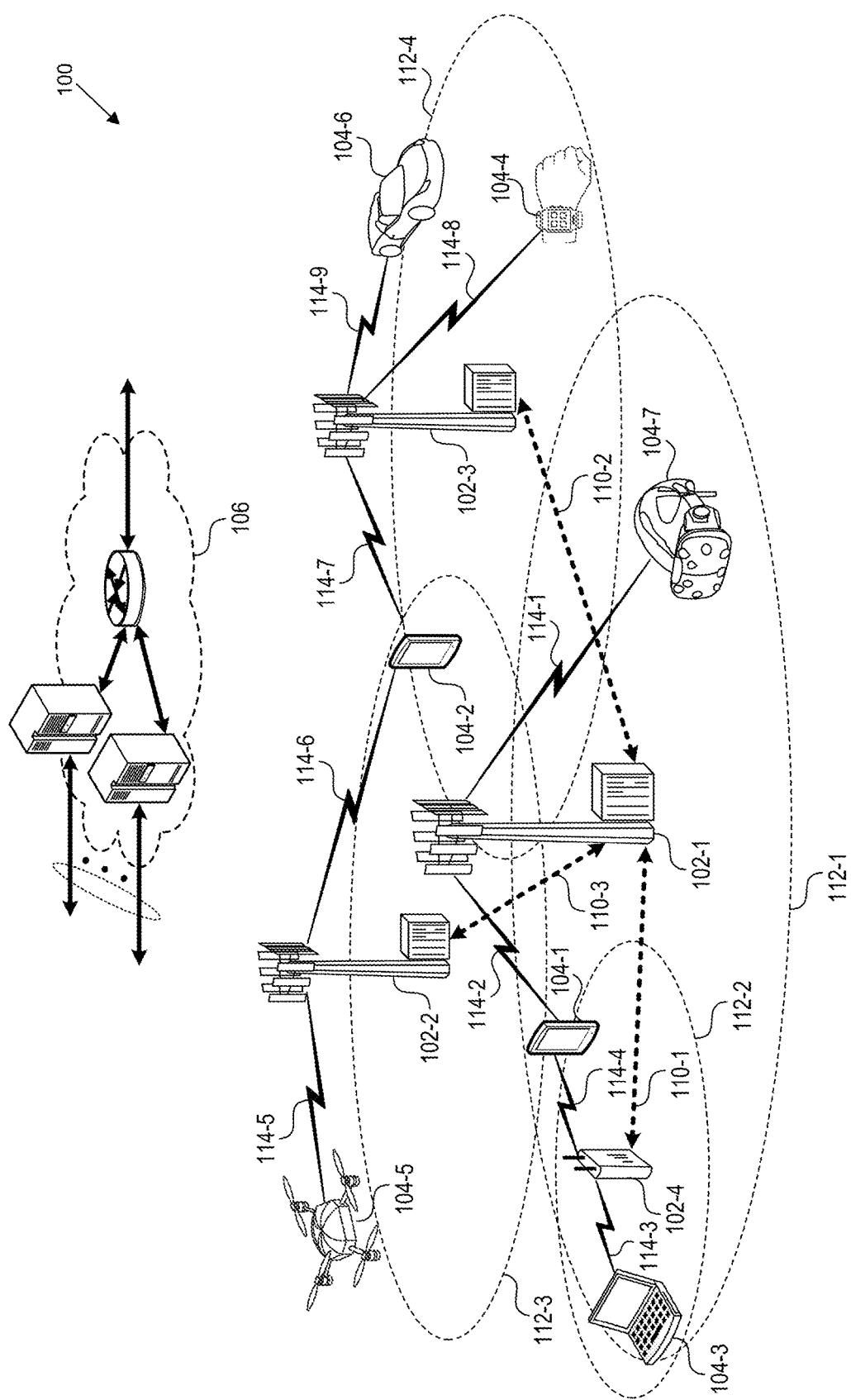
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology includes a solution that enables wireless network carriers ("carriers") to mitigate the detrimental effects of Subscriber Identification Module (SIM) swaps and other activities that compromise the security of wireless devices and networks. As indicated earlier, SIM swaps scams are examples of larger fraud schemes to steal an identity of a victim and then steal valuables from the victim. The disclosed technology includes a technique for a group of carriers to securely publish changes related to SIMs at a digital ledger. The digital ledger could be centralized and administered as a private service or as a public decentralized service. The shared, verifiable, and immutable nature of a public distributed ledger (e.g., blockchain) creates a trusted source for SIM data, and provides near-real time access to cross-carrier data, resulting in a significant improvement in fraud detection among different carriers. In addition, third-party entities that handle secure data could use the cross-carrier digital ledger to check whether wireless devices that are used as part of authentication processes have a greater likelihood of being unsafe. For example, a wireless device that recently experienced a change to a SIM card could be flagged to deny its use in an authentication process by an online service.

For example, on a cellular network, Mobile Station Integrated Services Digital Network (MSISDN) is a number that uniquely identifies a subscription in a wireless network. The MSISDN is the phone number associated with a single SIM card and is the number used to identify a mobile user for data sessions, when making a call, to send an SMS. The MSISDN performs a crucial function in ensuring secure connectivity between the different components within a wireless network. In one example of the disclosed technology, when an association between an MSISDN number and a SIM number changes, the changes are simultaneously published and verified on a distributed ledger, which is available for other carriers. The verifiable data on the distributed ledger could be leveraged to provide application programing interface (API) access for security queries, such as to determine whether a phone number associated with a transaction has recently changed. If so, a third party could deny using the associated wireless device as an authentication factor and/or monitor for additional abnormal transaction behavior.

The SIM-related data that is published on the distributed ledger can include or indicate changes associated with an Integrated Circuit Card Identifier (ICCID) or Embedded Universal ICCID (eUICCID) or SIM number, an International Mobile Subscriber Identity (IMSI), an International Mobile Equipment Identity (IMEI), an indication of a date that a transfer of a phone number occurred or became effective, etc. The SIM-related data can be published by carriers to the public for use, for example, by a service that relies on mobile phone numbers to confirm identities of users. An entity that retrieves the SIM-related data has a reasonable level of assurance that the owner of the phone number is the true owner based on the age of the SIM-related data.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Digital Ledger

A digital distributed leger refers to data records that are maintained across computers that are linked in a peer-to-peer network. In one example, a blockchain includes a digital distributed ledger that stores digital records of data such as transactions that are distributed and maintained among nodes of a computer network, where the entries are stored in blocks of the ledger that are cryptographically related. A public blockchain is a common example of a distributed ledger that can record transactions between parties in a verifiable and permanent way. Thus, a blockchain network has a decentralized, distributed database where a ledger is maintained by peer nodes. An intermediary is not required to maintain a blockchain. Further, the transactions are typically authenticated with cryptographic hashing and mining techniques.

A blockchain is analogous to a distributed database on a distributed computing network that maintains a continuously growing list of ordered records called blocks. A block of a blockchain includes records of transaction(s) or other recorded data (e.g., SIM-related data). Each block contains at least one timestamp, and a block links to a previous block to thus form a chain of blocks. Blockchains are inherently resistant to modification of their recorded data. In particular, once recorded, the data in a block cannot be altered retroactively. Through a peer network and distributed timestamping, a blockchain is managed in an autonomous manner.

Decentralized consensus can be achieved with a blockchain. This makes blockchains suitable for recording SIM-related data records, events, identity management, transaction processing, and proving data provenance. Well-known examples of decentralized networks that implement blockchains include the Bitcoin crypto-asset and cryptocurrencies such as Ethereum and Ripple. These types of networks provide a pragmatic solution for arriving at a consensus in the face of trust and timing problems typically encountered in distributed networks.

Figure 2:
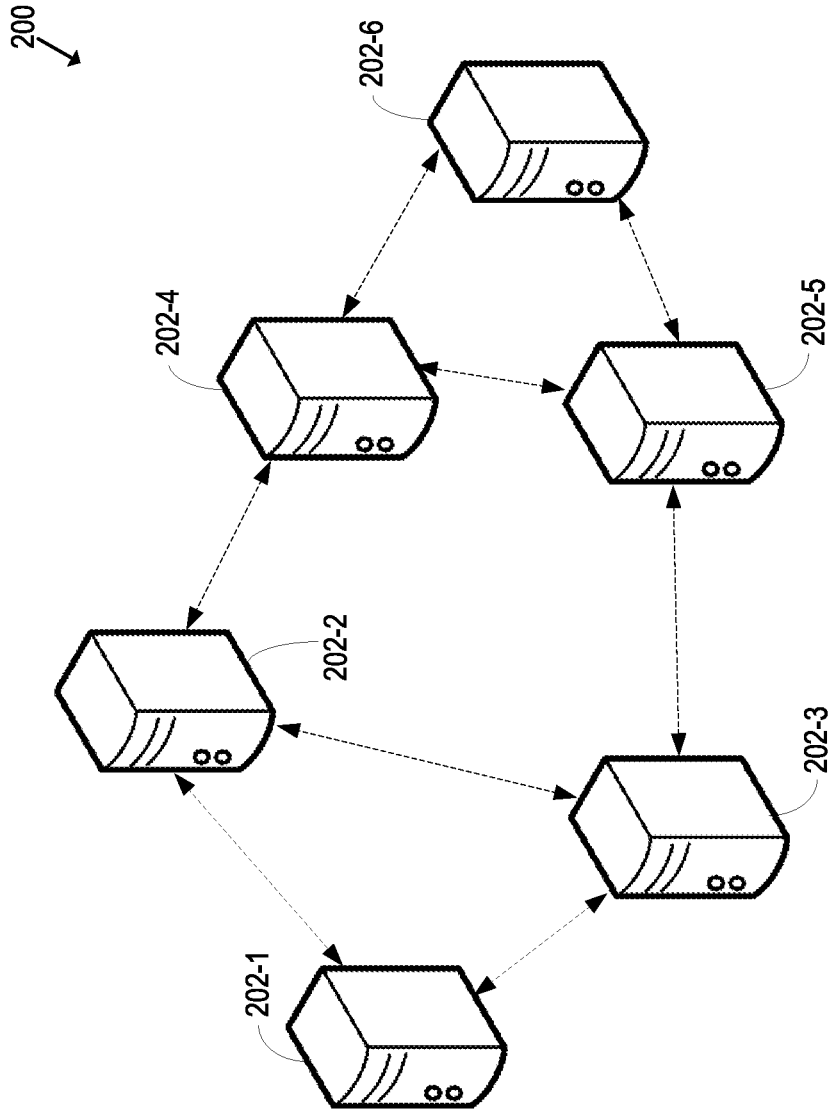
FIG. 2 is a block diagram that illustrates peer nodes of a cryptographically secured and distributed peer-to-peer network.

FIG. 2 is a block diagram that illustrates peer nodes of a cryptographically secured and distributed peer-to-peer network. As shown, the network 200 interconnects peer nodes 202-1 through 202-6 (also referred to collectively as "peer nodes 202" and individually as "peer node 202"). The peer nodes 202 can be distributed across various geographic locations including regions all over the world. The network 200 can include a combination of private, public, wired, or wireless portions. Data communicated over the network 200 can be encrypted or unencrypted at various locations or portions of the network 200. Each peer node 202 can include combinations of hardware and/or software to process data, perform functions, communicate over the network 200, and the like.

The peer nodes 202 can include computing devices such as servers, desktop or laptop computers, handheld mobile devices (e.g., smartphones, smartwatches), and any other electronic device. Any component of the network 200 can include a processor, memory or storage, a network transceiver, a display, operating system and application software (e.g., for providing a user interface), and the like. Other components, hardware, and/or software included in the network 200 that are well known to persons skilled in the art are not shown or discussed herein for the sake of brevity.

The network 200 can implement a blockchain that allows for the secure management of a shared ledger, where data are verified and stored on the network 200 without a governing central authority. Blockchains can be implemented in different configurations, ranging from public, open-source networks to private blockchains that require explicit permission to read or write transactions. Central to a blockchain are cryptographic hash functions that secure the network 200, in addition to enabling transactions, to protect a blockchain's integrity and anonymity.

The network 200 uses cryptography to securely process data. For example, public-key cryptography uses asymmetric key algorithms, where a key used by one party to perform either encryption or decryption is not the same as the key used by another in the counterpart operation. Each party has a pair of cryptographic keys: a public encryption key and a private decryption key. For example, a key pair used for digital signatures consists of a private signing key and a public verification key. The public key can be widely distributed, while the private key is known only to its proprietor. The keys are related mathematically, but the parameters are chosen so that calculating the private key from the public key is unfeasible. The keys could be expressed in various formats, including hexadecimal format.

Cross-Carrier System Overview

Figure 3:
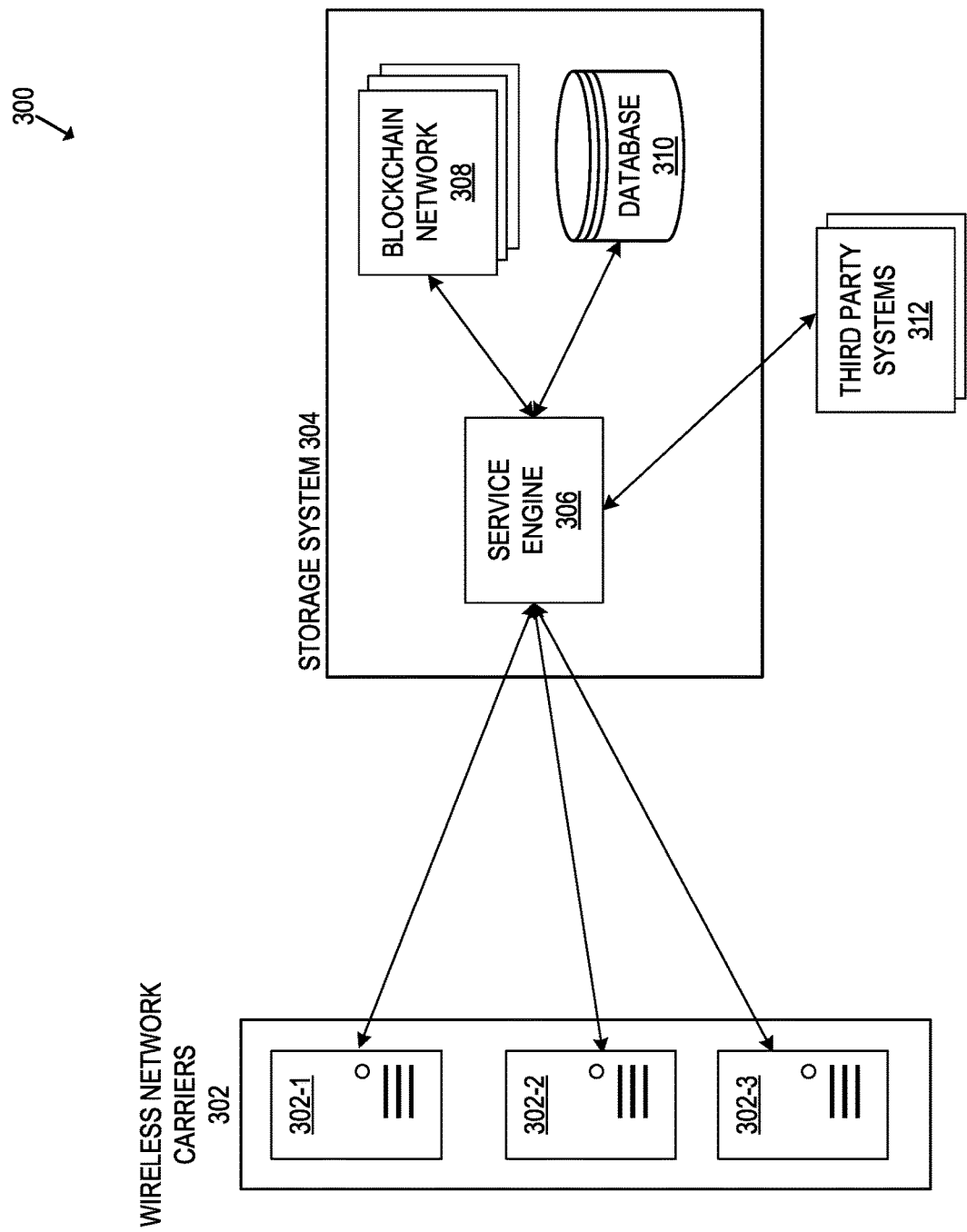
FIG. 3 is a block diagram that illustrates a cross-carrier system configured to store SIM-related data that is accessible to carriers or third-party entities.

FIG. 3 is a block diagram that illustrates a cross-carrier system configured to store SIM-related data that is accessible to multiple carriers and/or third-party entities. The system 300 includes one or more wireless network carriers 302-1 through 302-3 (referred to collectively as wireless network carriers 302) such as, for example, T-Mobile, AT&T, and Verizon, which can couple to a service engine 306 of a storage system 304. The storage system 304 can include a blockchain network 308 and/or a database 310 that stores the SIM-related data in a distributed and/or centralized manner, respectively. The system 300 also includes third-party systems that can query the storage system 304 for SIM-related data to, for example, authenticate a transaction performed on a mobile phone. Examples of the third-party systems include banking, healthcare, and other service providers who rely on mobile phone numbers to confirm the identity of a user or subscriber.

The components of the system 300 can connect over one or more networks through one or more network access nodes (not shown). The networks that interconnect the components of the system 300 can include any combination of private, public, wired, or wireless systems such as a cellular network, a computer network, the Internet, and the like. Any data communicated over the networks can be encrypted or unencrypted at various locations or along different portions of the networks.

The wireless network carriers 302 ("carriers 302") can communicate with the storage system 304, which can be remotely located from each other, or one included in the other. The components of the system 300 can store and transmit (e.g., internally and/or with other components over a network) code (composed of software instructions) and data (e.g., SIM-related data) using machine-readable media, such as non-transitory machine-readable media (e.g., machine-readable storage media such as magnetic disks, optical disks, read-only memory (ROM), flash memory devices, and phase change memory) and transitory machine-readable transmission media (e.g., electrical, optical, acoustical, or other forms of propagated signals, such as carrier waves or infrared signals).

One or more components of the system 300 can be implemented using different combinations of software, firmware, and/or hardware. The components of the system can include hardware such as one or more processors coupled to sensors and a non-transitory machine-readable media to store code and/or sensor data, user input/output (I/O) devices (e.g., a keyboard, a touchscreen, and/or a display), and network connections (e.g., an antenna) to transmit code and/or data using propagating signals. The coupling of the processor(s) and other components is typically through one or more busses and bridges (also referred to as bus controllers). Thus, a non-transitory machine-readable medium of a given component can store instructions for execution on a processor(s) of that electronic device.

The blockchain network 308 can store SIM-related data as data records in a distributed digital ledger. That is, the blockchain network 308 is distributed over a combination of network nodes (e.g., peer nodes 202) that store SIM-related data across other network nodes of a peer-to-peer network. The network nodes of the blockchain network 308 can each replicate and store an identical copy of the SIM-related data and update independently. Additionally or alternatively, the SIM-related data can be stored in a digital ledger of a centralized database 310.

The SIM-related data is captured from operations of networks and consumers. In one example, when an association between an MSISDN number and a SIM number changes, the change is captured and published on the blockchain network 308. The data indicative of the change can be referred to herein as a "data record" including the SIM-related data. The SIM-related data can indicate changes associated with an ICCID, which is a component of the SIM or embedded SIM (eSIM). An ICCID is a globally unique classifier that can be used to identify SIM hardware and used to tell apart one SIM from another. This number is stored digitally, but typically also physically engraved into a SIM card's body.

Other examples of SIM-related data can include or indicate an IMSI, IMEI, MSISDN, a date when a change occurred or became effect (e.g., transfer occurred or became effective), etc. The IMSI number is what cellular networks used to identify a specific subscription that is included as part of a subscriber's data plan. Every time a device wants to establish a connection to a network, the network will identify the device by the IMSI. Thus, the ICCID is used to identify the SIM card, while the IMSI is used to identify the type of connectivity service. The IMEI number is typically printed on the battery component of any device with networking capabilities. It is a unique identifier for each device and is checked against a worldwide IMEI database when connected.

With the emergence of eSIMs, a new identification number, known as the eUICCID number, has been established. A company may want to manufacture physical eSIMs but also generate and sell eSIM profiles. In some cases, carriers will collaborate with other providers in order to create eSIM profiles, which means multiple parties may be involved in the creation of an eSIM. To simplify this situation and avoid confusion, the networking industry has created the eUICCID to identify physical eSIMs separately. The eUICCID number is an entirely different and unique classifier, however, an ICCID is typically still created along with the eSIM profile.

The service engine 306 can receive the SIM-related data from the wireless network carriers 302 and store the SIM-related data on the blockchain network 308 and/or the database 310. In one example, the service engine 306 administers a service configured to aggregate SIM-related data, index the SIM-related data, and store the indexed SIM-related data on the blockchain network 308. The service engine 306 can thus mediate the flow of SIM-related data from the carriers 302 to the blockchain network 308 and/or database 310. In some examples, the service engine 306 can include any number of server computers communicatively coupled to the carriers 302. The service engine 306 can include combinations of hardware and/or software to process SIM-related data, perform functions, communicate over the networks, etc. For example, server computers of the service engine 306 can include a processor, memory or storage, a transceiver, a display, operating system and application software, and the like. Other components, hardware, and/or software included in the system 300 that are well known to persons skilled in the art are not shown or discussed herein for brevity.

The service engine 306 can store the SIM-related data obtained from the carriers 302 on the blockchain network 308 and/or database 310. In some examples, the service engine 306 can augment the SIM-related data received from the wireless network carriers 302. For example, the service engine 306 can timestamp SIM-related data and add values that depend on the estimated geographic location of the change to the SIM. The service engine 306 can obtain timestamps and estimate its location based on global positioning system (GPS) data. The service engine 306 can also verify SIM-related data and administer tools such as a search tool to search for SIM-related data stored on the blockchain network 308 or the database 310. The service engine 306 can thus store and retrieve SIM-related data in/from a blockchain network 308 and/or a database 310.

The service engine 306 includes a search tool that is accessible from the third-party systems 312 to search for SIM-related data. For example, the service engine 306 can administer a user interface (UI) with a textbox to receive criteria for SIM-related data. The search tool queries the blockchain network 308 or database 310 for SIM-related data that satisfies the search criteria. For example, a financial institution can query a change to a SIM card associated with a phone number of a user looking to perform a financial transaction, which requires authenticating the user. The search results can include the SIM-related data associated with the phone number (e.g., one or more data records), as well as one or more timestamps indicating time(s) when change(s) occurred.

The SIM-related data can be published by wireless network carriers 302 to the public for use, for example, by the third-party systems 312 that rely on mobile phone numbers to confirm identities of users. The third-party systems 312 that retrieve the SIM-related data can infer a reasonable level of assurance that the owner of the phone number is the true owner. The third-party systems 312 could leverage the verifiable data on the blockchain network 308 to provide API access for security queries, such as to determine whether a phone number associated with a transaction has recently been changed. If the phone number has been changed recently, the third party could monitor for additional abnormal transaction behavior.

In one example, the wireless network carriers 302 publishes SIM-related data indicative of a change to an association between a SIM card and a phone number of a wireless device. The SIM-related data is sent to the service engine 306, which can store the data to the blockchain network 308 and/or the database 310. The third-party systems 312 include a financial institution that can query the service engine 306 based on a phone number of one of its customers to identify whether that phone number is associated with a change as indicated in the blockchain network 308 or database 310. The service engine 306 can query the database 310 for matching data to determine whether there is an indication of a SIM swap. If so, the financial institution can deny the transaction associated with the phone number due to being suspicious of malicious activity. As such, the service engine 306 can use phone numbers to manage identities, which would be made available to those who have a use for them or for other transactions. The processing of a query could occur in real-time or near real-time.

In another example, SIM-related data is published at the storage system 304 with accompanying history. As such, the cumulative life of the association between a phone number and SIM number is maintained. The SIM-related data and accompanying history is stored at the blockchain network 308 for use to show history of ownership as well as duration of ownership. In this example, only the most recent data stored at the storage system 304 is available to query by the wireless network carriers 302 or the third-party systems 312.

The protocol used for accessing the data from the storage system 304 could include an API or it could be distributed through other means.

In one implementation, SIM-related data is tokenized and represented as non-fungible digital assets such as non-fungible tokens (NFTs). Smart contracts could be leveraged to define conditions around ownership of the NFTs and provide access to generate metadata-based insights, such as timestamps and affiliation without risking privacy. By moving business logic of token exchange out of each organization and onto the blockchain, enforcement of rules including cool-down periods and frequency caps could be placed on the blockchain itself.

Cross-Carrier Digital Ledger Processes

Figure 4:
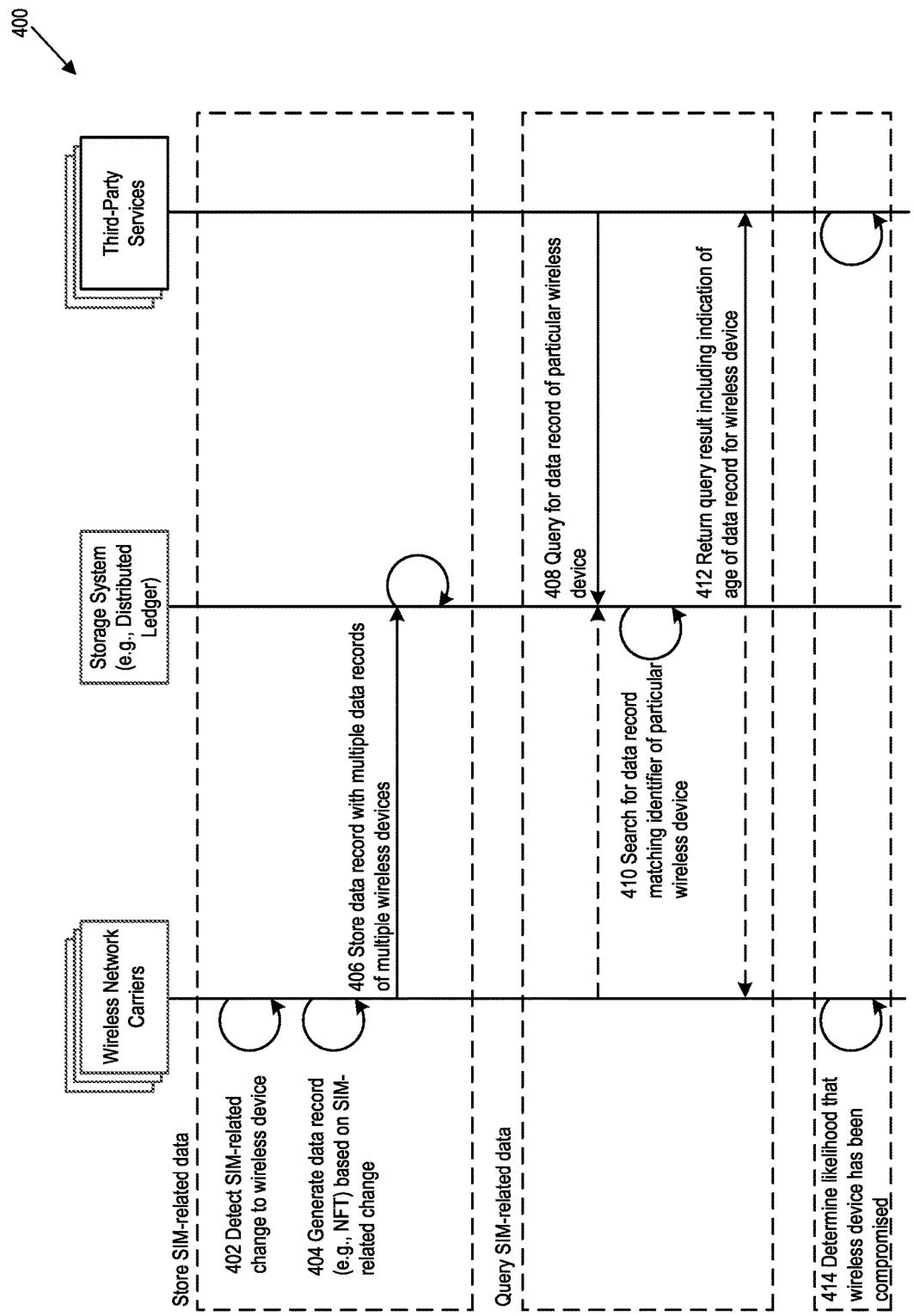
FIG. 4 is a flow diagram that illustrates processes for using SIM-related data to determine the likelihood that a wireless device has been compromised.

FIG. 4 is a flow diagram that illustrates processes 400 for using SIM-related data to determine the likelihood that a wireless device has been compromised. The age of a record of a SIM-related change to a wireless device is indicative of whether the wireless device has been the subject of a SIM-swap fraud or other malicious activity. For example, an older record of a SIM-related change suggests that the wireless device is not the subject of a SIM-swap fraud whereas a newer record of the same thing has a greater likelihood of a potential SIM-swap fraud. The processes 400 are performed by one or more systems including multiple wireless network carriers ("carriers") that detect SIM-related changes and generate SIM-related records ("data records"), a storage system (e.g., a centralized or distributed digital ledger) that stores the data records of multiple carriers, and one or more third-party entities that can query the data records to determine the likelihood that the SIMs of wireless devices have been compromised.

At 402, a particular carrier can detect a change related to a SIM of a wireless device. The SIM is configured for the carrier to support the wireless device on a particular telecommunications network. In one example, the carrier detects that an association between a SIM number and a telephone number of a wireless device has changed. In this example, the change can include a different SIM, a different telephone number, or a different telecommunications network or carrier. The carrier can detect a change in parameters including an ICCID, an IMSI, an IMEI, an eSIM, or an eUICCID.

At 404, the carrier can generate a data record indicative of the change. The carrier (or a separate system) can associate the data record with a timestamp indicative of a time when the change occurred. Additionally or alternatively, a timestamp can be added to a data record later when the data record is stored in a storage system. In one example, the change is recorded as a digital non-fungible asset. An example of a digital non-fungible asset is an NFT that represents the detected change and has an associated timestamp.

At 406, the storage system can store the data record along with multiple data records for multiple wireless devices. The storage system can include a centralized or decentralized database that is accessible to multiple carriers and/or third-party services. In one example, multiple carriers publish multiple data records (e.g., NFTs) on a distributed ledger residing on a cryptographically secured and distributed peer-to-peer network. The network can include a public blockchain that operates independent of any carrier or a private blockchain that is operated by, for example, a carrier or private service. The multiple data records are each associated with respective timestamps for respective wireless devices.

At 408, the storage system is queried for a data record of a particular wireless device. The storage system can be queried by another carrier or a service of a third-party entity. If a matching data record is found, the age of the data record is used to infer the likelihood that the wireless device has been compromised. Hence, the ages of data records can be used to authenticate wireless devices. As indicated earlier, in some examples, data records of the storage system are accessible by carriers and/or other entities via an API.

In one illustrative example, a third-party service receives a request to determine whether an authentication process should be allowed. The request could be sent from a financial institution or entity that administers a secure portal that seeks to authorize a user to access the portal. When the user submits credentials to access the portal, a one-time-passcode can be issued in an SMS message to a user's mobile device. The passcode is entered into the portal and, if correct, the user is allowed to access information through the secure portal. The telephone number (or other unique identifier) of that mobile phone can be used to search for a matching data record. The age of the record can be used to infer whether the mobile phone can be trusted.

At 410, the storage system is queried for a data record indicative of a change associated with a SIM of the particular wireless device. In one example, the query includes an identifier of the wireless device such as a phone number, which is then used to search for a matching data record. For example, the system can search through multiple NFTs on the blockchain for a particular NFT including the particular telephone number. The system can optionally calculate the age of the particular NFT based on a difference between a current time and a particular timestamp of the particular NFT.

In one example, the data records stored on the cryptographically secured and distributed peer-to-peer network are each labelled as "safe" or "unsafe" based on their ages. For example, one or more age thresholds can be set to filter data records. The data records that exceed a certain age threshold are tagged as safe, while data records that are less than a certain age threshold are tagged as unsafe. For example, data records that are less than a day old can be used to consider the wireless device as unsafe or risky whereas data records that are older than a week can be used to designate the wireless device as safe and not risky.

At 412, a result is communicated to the entity that submitted the query. The result can indicate the age of the particular data record. The age can include an indication of the timestamp, a measure of the difference between the current time and the timestamp, or a range or level. For example, the result can indicate that a data record is more than one week old, less than one day old, etc. The age of the data record is measured relative to a timestamp of the data record stored on the distributed ledger and, as such, the system can determine whether to authenticate the wireless device based on the age of the data record.

Alternatively, the query result can indicate the result of an analysis based on the age. For example, the result can include an indication that the data record is "safe," "probably safe," "probably risky," or "risky." In one example, the age of a "risky" data record is less than a first threshold, the age of a "probably risky" data record exceeds the first threshold but is less than a second threshold, the age of the "probably safe" data record exceeds the second threshold but is less than a third threshold, and the age of the "safe" data record exceeds the third threshold. The thresholds can be fixed or dynamic based on the relative ages of other data records for the same or different wireless devices.

At 414, the system can determine the likelihood that the particular wireless device has been compromised based on an age of a particular data record stored on the cryptographically secured and distributed peer-to-peer network. The entity can determine that the particular wireless device is associated with potential malicious activity when the age is less than a threshold age (e.g., 1 day) or associated with normal activity when the age exceeds a threshold age (e.g., 1 week). As such, the third-party entity can authenticate the wireless device based on the age of the data record (e.g., when the age exceeds a threshold age) or deny authentication (e.g., when the age is less than a threshold age).

Computer System

Figure 5:
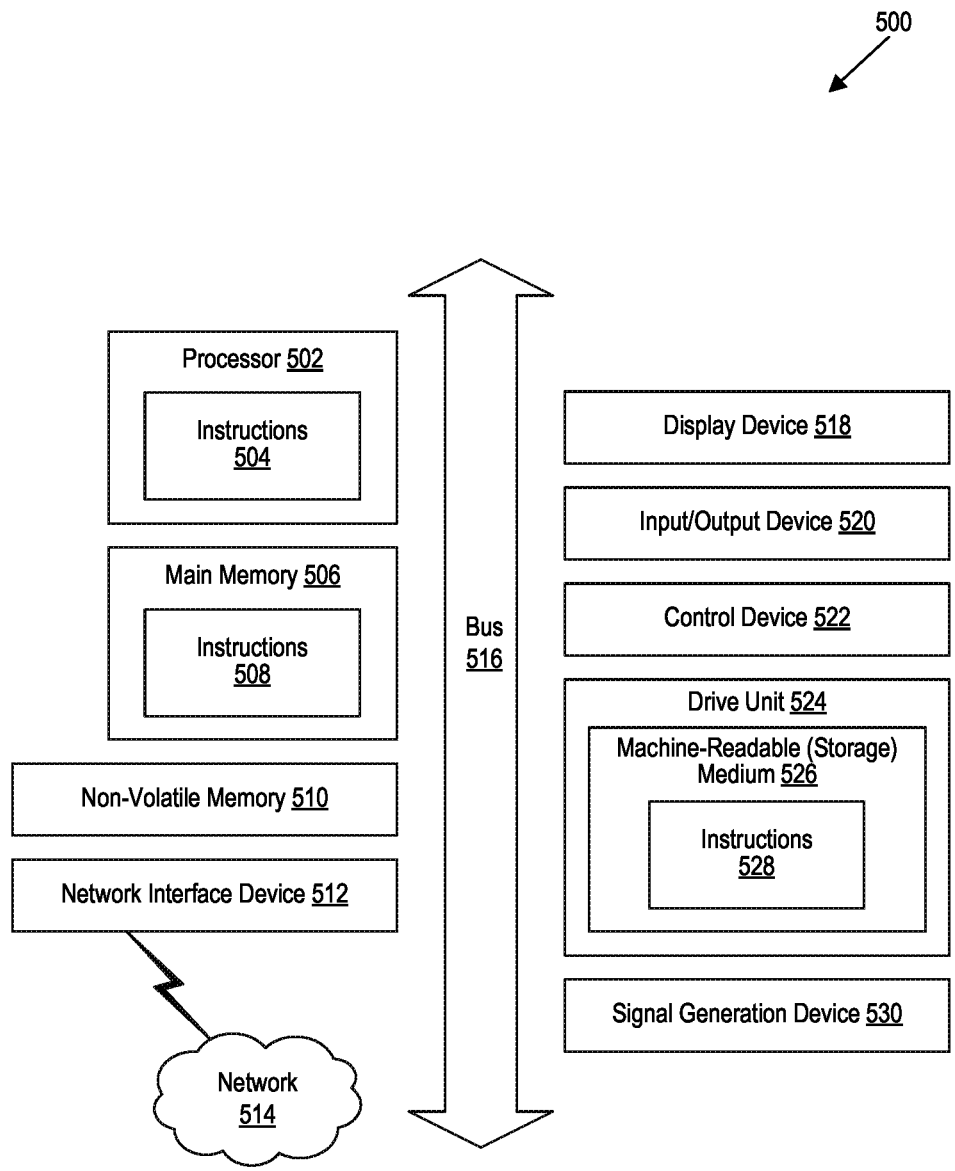
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A computer-readable storage medium, excluding transitory signals and carrying instructions, which, when executed by at least one data processor of a system, cause the system to:
   detect a change related to an association between a subscriber identity module (SIM) and a telephone number of a wireless device,
      wherein the SIM is configured for a telecommunications network, and
      wherein the change includes a different SIM, a different telephone number, or a different telecommunications network that supports the wireless device;
   generate a data record indicative of the change related to the association between the SIM and the telephone number of the wireless device;
   cause storage of the data record on a distributed ledger residing on a cryptographically secured and distributed peer-to-peer network,
      wherein the distributed ledger stores multiple data records that are published and accessible to multiple entities including a wireless network carrier of the telecommunications network, and
      wherein the multiple data records are each associated with a respective timestamp for a respective wireless device; and
   determine whether a particular wireless device is associated with potential malicious activity based on an age of a particular data record stored on the cryptographically secured and distributed peer-to-peer network,
      wherein the age is determined relative to a particular timestamp associated with the particular data record.

2. The computer-readable storage medium of claim 1, wherein to generate the data record comprises causing the system to:
   generate a digital non-fungible token (NFT) that represents the change related to the association between the SIM and the telephone number of the wireless device, wherein the multiple data records correspond to multiple NFTs.

3. The computer-readable storage medium of claim 1, wherein the system is further caused to:
   determine that the particular wireless device is associated with potential malicious activity when the age is less than a threshold age.

4. The computer-readable storage medium of claim 1, wherein the system is further caused to:
   determine that the particular wireless device is not associated with a potential malicious activity when the age exceeds a threshold age.

5. The computer-readable storage medium of claim 1, wherein the change related to the association between the SIM and the telephone number of the wireless device comprises a change to:
   an Integrated Circuit Card Identifier (ICCID),
   an International Mobile Subscriber Identity (IMSI),
   an International Mobile Equipment Identity (IMEI),
   an embedded SIM, or
   an embedded universal ICCID (eUICCID).

6. The computer-readable storage medium of claim 1, wherein to generate the data record comprises:
   associating the data record with a timestamp indicative of when the change related to the association between the SIM and the telephone number of the wireless device occurred.

7. The computer-readable storage medium of claim 1, wherein the cryptographically secured and distributed peer-to-peer network comprises a public blockchain that operates independent of any wireless network carrier.

8. The computer-readable storage medium of claim 1, wherein the cryptographically secured and distributed peer-to-peer network comprises a private blockchain that is operated by the wireless network carrier.

9. The computer-readable storage medium of claim 1, wherein the respective timestamp associated with each data record indicates a time when the distributed ledger received the respective data record.

10. The computer-readable storage medium of claim 1, wherein the multiple data records stored on the cryptographically secured and distributed peer-to-peer network are accessible via an application programming interface (API) by multiple third-party entities that did not generate the multiple data records, and wherein the multiple data records are factors for authenticating respective wireless devices.

11. The computer-readable storage medium of claim 1, wherein the multiple data records stored on the cryptographically secured and distributed peer-to-peer network are each labelled as safe or unsafe based on a risk of malicious activity that is related to a respective age of each data record.

12. A computer-readable storage medium, excluding transitory signals and carrying instructions, which, when executed by at least one data processor of a system, cause the system to:
   cause storage of a digital non-fungible token (NFT) on a blockchain network that stores multiple NFTs,
      wherein the multiple NFTs are generated by one or more wireless network carriers,
      wherein the multiple NFTs are accessible by multiple entities including entities other than the one or more wireless network carriers, and
      wherein each NFT has a timestamp associated with occurrence of a change related to a subscriber identity module (SIM) of a wireless device;
   receive, from a particular third-party entity, a query including a particular telephone number of a particular wireless device;
   in response to the query:
      search the multiple NFTs on the blockchain for a particular NFT including content that matches the particular telephone number, and
      calculate an age of the particular NFT based on a difference between a current time and a particular timestamp of the particular NFT; and
   return, to the particular third-party entity, a query result including at least an indication of the age of the particular NFT.

13. The computer-readable storage medium of claim 12, wherein the system is further caused to:
   determine that the particular wireless device is associated with potential malicious activity when the age of the particular NFT is less than a threshold,
      wherein the query result includes an indication that the wireless device is associated with potential malicious activity.

14. The computer-readable storage medium of claim 12, wherein the system is further caused to:
   determine that the particular wireless device is associated with normal activity when the age of the particular NFT exceeds a threshold,
      wherein the query result includes an indication that the wireless device is associated with normal activity.

15. The computer-readable storage medium of claim 12, wherein the multiple NFTs on the blockchain are accessible to the multiple entities via an application programming interface (API).

16. A system comprising:
- at least one hardware processor; and
- at least one non-transitory memory storing instructions, which, when executed by the at least one hardware processor, causes the system to:
  - receive a request to authenticate a wireless device based on a passcode communicated to the wireless device,
    - wherein the request is associated with a unique identifier of the wireless device;
  - in response to the request, query a distributed ledger, residing on a cryptographically secured and distributed peer-to-peer network, for a data record indicative of a change associated with a subscriber identity module (SIM) of the wireless device,
    - wherein the distributed ledger stores multiple data records that are accessible by multiple entities including multiple wireless network carriers that publish the data records on the distributed ledger, and
    - wherein the multiple data records are each associated with a respective timestamp and a respective wireless device; and
  - receive an indication of an age of the data record stored on the distributed ledger,
    - wherein the age of the data record is measured relative to a timestamp of the data record stored on the distributed ledger; and
  - determine whether to authenticate the wireless device based on the age of the data record.

17. The system of claim 16 further caused to:
deny authentication of the wireless device when the age of the data record is less than a threshold age.

18. The system of claim 16 further caused to:
grant authentication of the wireless device when the age of the data record exceeds a threshold age.

19. The system of claim 16, wherein the request is to enable access to a secure application through the wireless device based on a one-time passcode in an SMS message that is communicated to the wireless device, and wherein the unique identifier of the wireless device is a telephone number of the wireless device.

20. The system of claim 16, wherein the multiple data records correspond to digital non-fungible assets that represent changes related to associations between SIM numbers and telephone numbers of respective wireless devices.

* * * * *